United States Patent [19]

Koch et al.

[11] Patent Number: 4,839,485

[45] Date of Patent: Jun. 13, 1989

[54] APPARATUS FOR THE UNIFORM AND RAPID HEATING OF FOODSTUFFS

[75] Inventors: Klaus Koch; Manfred Klemm, both of Laatzen, Fed. Rep. of Germany

[73] Assignee: Herman Berstorff Maschinenbau GmbH, Hanover, Fed. Rep. of Germany

[21] Appl. No.: 179,642

[22] Filed: Apr. 8, 1988

[30] Foreign Application Priority Data

Apr. 15, 1987 [DE] Fed. Rep. of Germany ....... 3712753

[51] Int. Cl.⁴ .............................................. H05B 6/78
[52] U.S. Cl. ...................... 219/10.55 A; 219/10.55 E; 219/10.55 F; 422/21; 422/286; 426/234; 426/241
[58] Field of Search ................. 219/10.55 A, 10.55 R, 219/10.55 F, 10.55 E, 10.55 B; 422/21, 22, 285, 286; 426/234, 241, 243, 107

[56] References Cited

U.S. PATENT DOCUMENTS

| | | | |
|---|---|---|---|
| 3,699,899 | 10/1972 | Schiffmann et al. | 219/10.55 A |
| 3,745,291 | 7/1973 | Peterson et al. | 219/10.55 R |
| 4,456,806 | 6/1984 | Arimatsu | 219/10.55 F |
| 4,687,895 | 8/1987 | Chitre et al. | 219/10.55 A |

Primary Examiner—Philip H. Leung
Attorney, Agent, or Firm—Foley & Lardner, Schwartz, Jeffery, Schwaab, Mack, Blumenthal & Evans

[57] ABSTRACT

An apparatus is provided for the uniform and rapid heating of foodstuffs, usually for pasteurization and sterilization purposes, by means of microwave energy. The cross-sectional shape of the outlet of the wave guides through which the microwave energy is supplied is selected so as to be geometrically similar to that of the product to be treated. A spacing is maintained between the outlet aperture and the surface of the product, which spacing is not greater than the wavelength of the microwave energy be used. These features provide rapid and appropriate processing of a food product while, at the same time, preventing the harmful overheating of the edge regions of the product.

9 Claims, 2 Drawing Sheets

D = 50

| 78 | | 70 |
| | 67 | |
| 67 | 77 | 72 |
| | 70 | |
| 66 | | 71 |

D = 20

| 50 | | 59 |
| | 56 | |
| 55 | 71 | 58 |
| | 67 | |
| 50 | | 54 |

D = 180

| 54 | 50 | 55 |
| | 42 | |
| 55 | 31 | 53 |
| | 39 | |
| 58 | 51 | 59 |

APPARATUS FOR THE UNIFORM AND RAPID HEATING OF FOODSTUFFS

FIELD OF THE INVENTION

The present invention relates to an apparatus for the uniform and rapid heating of foodstuffs. More particularly, the present invention relates to a microwave heating apparatus used primarily for the pasteurisation or sterilisation of foodstuffs.

BACKGROUND OF THE INVENTION AND PRIOR ART DISCUSSION

Microwave heating apparatuses of this general type are known. Thus, German Offenlegungsschrift No. 3 447 544 A1 discloses an apparatus which comprises an elongate microwave treatment chamber having an endless conveyor belt passing therethrough. Microwave supply conduits project into the treatment chamber from above, each conduit communicating with a respective microwave generator. A control device, which is connected to each microwave generator, switches the generators off whenever the edges of a foodstuff pack to be treated pass beneath the supply aperture, so that the risk of the edges of the pack becoming overheated is obviated or at least minimised. By means of, for example, a photocell or any other suitable device which is also connected to the control device, a signal is transmitted to the control device when the end faces of the foodstuff packs located on the conveyor belt, pass beneath the supply apertures of the microwave generators. However, such an arrangement cannot achieve uniform and rapid heating of the foodstuff packs.

German Patentschrift No. 1 291 429 discloses an apparatus for the dielectric heating of substances which apparatus includes a microwave generator and a high-frequency generator. Interchangeable field shapers are disposed at the ends of the waveguides facing the treatment chamber which permit the depth of penetration of the microwave energy into the product, that is to say, the concentration of the microwave energy, to be taken into consideration. However, a product cannot be uniformly heated over its entire area using such an apparatus, because controlling the depth of penetration presupposes that the concentration is at the desired level. Moreover, the depth of penetration is also dependent on the particular product being treated.

OBJECT OF THE INVENTION

The present invention seeks to provide an apparatus which is generally of the above-described type but in which highly uniform and rapid heating of foodstuffs can be effected by means of microwave energy in an elongate processing chamber, while simultaneously preventing the edges of the foodstuffs from becoming overheated.

SUMMARY OF THE INVENTION

According to the present invention there is provided an apparatus for the uniform and rapid heating of foodstuffs for pasteurisation or sterilisation purposes, the foodstuff being contained in sealed containers or packs permeable to microwaves, comprising an elongate treatment chamber, endless conveyor means carrying said containers or packs through said chamber, wave guide means projecting into said chamber and directed towards said conveyor means, at least one microwave generator means communicating with said wave guide means, control device means for controlling said generator means, microprocessor means for controlling said control device means and scanning means connected to said control means wherein said wave guide means includes an outlet, the cross-sectional shape of said outlet being selected to correspond generally with the geometrical surface shape of said foodstuff to be treated, said outlet being spaced from said surface of said foodstuff by a distance which is, at most, equal to one wavelength of the microwave energy used to irradiate said foodstuff.

By ensuring that the cross-sectional shape of the individual outlet apertures of the microwave wave guides correspond geometrically with the shape of the surface of the pack or container, for example, by ensuring that the wave guides have outlets which are circular in cross-section when the pack of foodstuff is circular, a highly effective and economical introduction of energy is achieved with minimal radiation losses. In addition, the uniform heating of the product from its edges to the center is considerably enhanced.

An additional improvement in terms of the introduction of the energy into the product in a uniform and economical manner is achieved by causing the cross-sectional area of the outlets of the wave guides to be a function of the surface area of the product. Optimum results are achieved if the ratio of the cross-sectional area of the outlet relative to that of the product is maintained within the range 1:2 to 1:8, preferably at 1:4.

By maintaining the spacing of the outlet from the surface of the product so that it is equal to or shorter than one wavelength of the radiation being employed, for example, equal to or less than 12 cm in the case of a radiation having a wavelength of 12 cm (corresponding to a frequency of 2.45 G Hz), the effiency of the introduction of energy increases. In particular, a very uniform distribution of temperature over the entire area of the product, that is to say, from the centre thereof to the edges, is achieved.

The geometrically similar cross-sectional shapes of the outlets of the wave guides and of the surface of the product or, respectively, of the surface of the container or pack are particularly advantageous. This measure reduces the radiation which passes beyond the edges of the product. Accordingly, the edge regions of the pack are impinged with less energy. In consequence, the harmful overheating of the edges of the pack or product is precluded. The energy which is not directly introduced into the product remains in the treatment chamber as low-density scattered energy.

If, for example, a wave guide outlet having a circular cross-section is used to treat a rectangular pack, the proportion of direct, and therefore controllable, irradiation is reduced so that a non-uniform temperature field is produced in the product.

The provision of displaceable sleeves on the ends of the supply conduits is desirable because this makes it possible to vary the spacing of the wave guide outlets from surface of the product simply in an advantageous manner.

If the wave guides are circular the sleeve can be made displaceable by providing the wave guide with an external screw thread which co-operates with an internal screw thread provided on the sleeve. If the supply conduits are rectangular or square, the sleeve can be made displaceable by, for example, providing rack-and-pinion gears on the wave guides which gears mesh with rotatable drive pinions provided on the sleeve.

BRIEF DESCRIPTION OF THE DRAWINGS

One embodiment of an apparatus in accordance with the present invention will be further described, by way of example, with reference to the accompanying drawings, in which.

DESCRIPTION OF PREFERRED EMBODIMENTS

Figure 1:
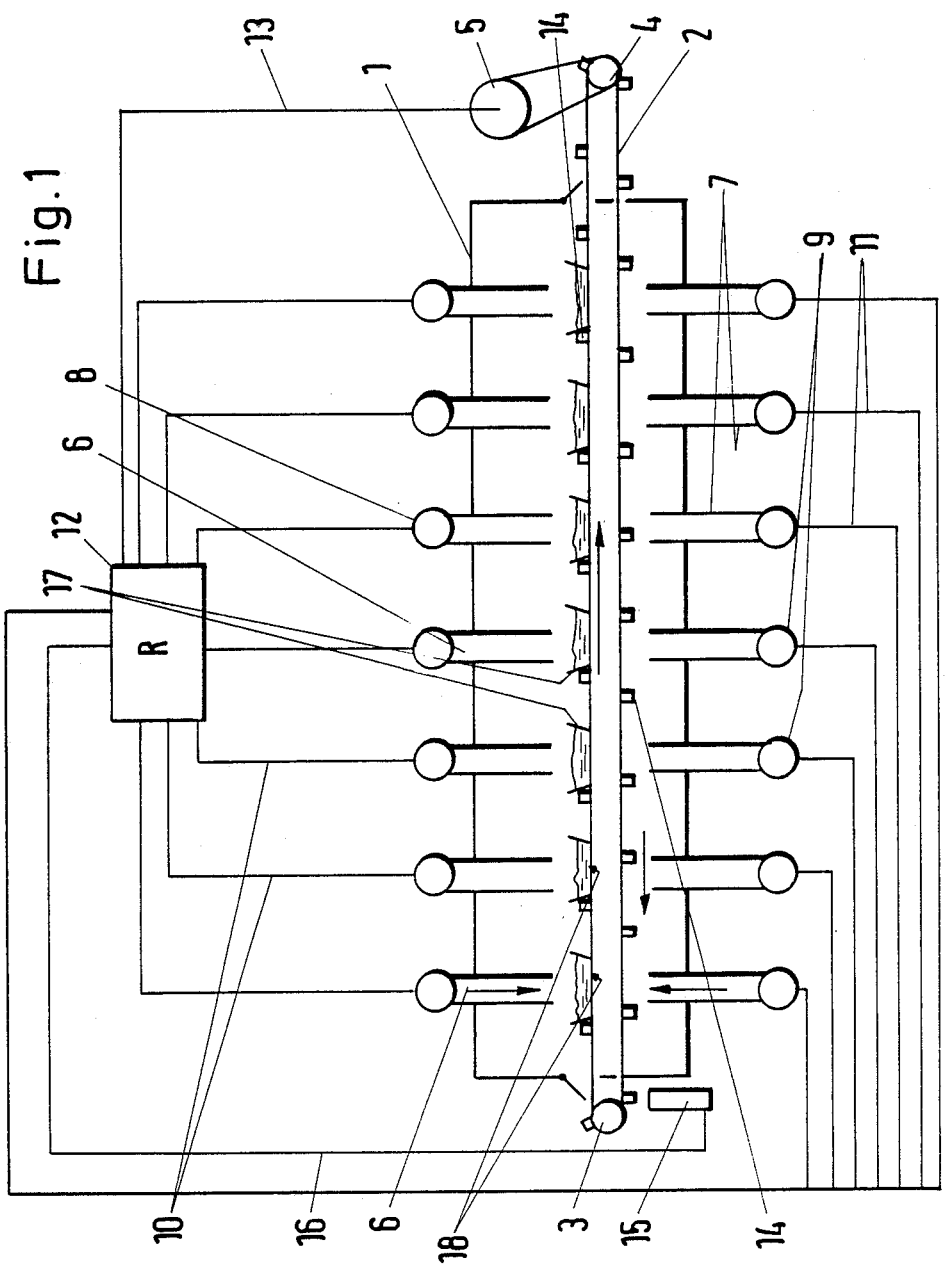
FIG. 1 is a schematic, longitudinal sectional view through a microwave heating apparatus in accordance with the present invention.

In FIG. 1, there is shown a microwave heating apparatus which comprises a treatment chamber 1. An endless conveyor belt 2, guided around guide rollers 3 and 4, extends through the chamber 1. The belt 2 is driven by schematically shown drive means 5 which communicate with the guide roller 4.

Microwave supply guides 6 and 7 extend into the treatment chamber 1 above and below the belt 2 respectively. The conduits 6 each communicate with a generator or magnetron 8 and the guides 7 each communicate with a generator or magnetron 9. The generators or magnetrons 8 and 9 produce the desired microwave energy. The magnetrons 8 communicate with a computer-controlled control device 12 by means of electrical connectors 10 and the magnetrons 9 communicate with the control device 12 by means of electrical connectors 11.

The drive means 5 is also connected to the control device 12 by means of an electrical connector 13. This makes it possible for the conveyor belt 2 to be driven at timed intervals.

To effect operation of the system at timed intervals, marker strips 14 are provided at regularly spaced-apart intervals on the conveyor belt 2. Colored markers, which are detectable by means of a photocell, or metal components, which are detectable by proximity switches, may be utilized instead of the strips 14.

In the embodiment shown, a photocell 15 is provided for scanning the marker strips 14. The photocell 15 is connected to the control device 12 by means of an electrical connector 16.

Figures 2, 3, 4, 5:
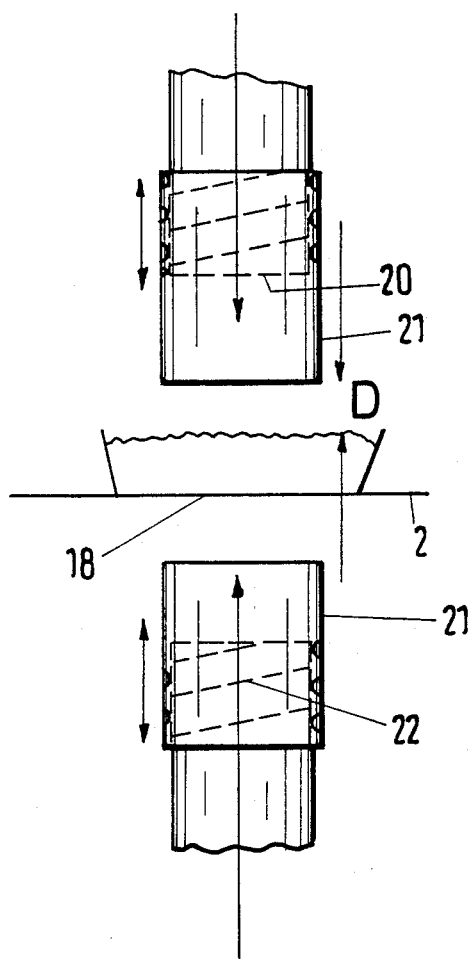
FIG. 2 is a cross-sectional view through the end regions of a preferred form of supply conduits included in the apparatus shown in FIG. 1.
FIGS. 3 to 5 show comparative temperature distribution charts in a foodstuff being treated to show the effect of changing the spacing of the ends of the microwave supply conduits from the foodstuff.

In FIG. 2, there is shown a pair of wave guides which are each provided with sleeve members 21. The sleeve members 21 are mounted on the end regions 20 of the wave guides and are adjustable vertically thereon by means of complementary screw threads 22. By providing such sleeves, the spacing D between the wave guide outlet 20 and the pack being treated can be varied in accordance with requirements. The method of operation and the use of the above-described system will now be described with reference to a practical example.

A prepared dish of lasagne is introduced into a food pack. The pack is formed, for example, from a deep-drawn and sealed plastics film. The filled pack is to be subjected to a pasteurising process to kill germs. This extends the time period in which it is safe to eat the food, that is to say, the "eat-by" period and prolongs the shelf-life of the product.

The packs have a length of 190 mm, a width of 140 mm, a height of 28 mm and a weight of 400 g.

The further description of this example will refer to the timed impingement of the pack with microwave energy. However, although such timed impingement may be used in practice, it is of no significance for ensuring the product is uniformly heated over its entire area.

In order to maintain the product temperature of 80° C. for one minute, which temperature is desirable to achieve satisfactory pasteurisation, a power requirement of 2.4 kW per pack is calculated for the through-flow period, assuming that the product has an initial temperature of 20° C.

The control device is set to cause each magnetron 8 and 9 to provide a power output of 1.2 kW, so that, from the wave guides 6 and 7 taken in combination, each pack of lasagne is subjected to an output of 2.4 kW for one minute. In the embodiment shown, there are seven sequential upper and seven sequential lower wave guides 6 and 7 respectively, which guides are arranged in pairs comprising one upper guide 6 and one lower guide 7. The total impingement period of one minute is therefore split into seven equal portions of approximately 8.5 seconds. In other words, the control device causes the conveyor belt to operate intermittently so that the pack of lasagne remains stationary, centrally disposed at 18 between each pair of guides 6 and 7 for a period of 8.5 seconds.

Hence, the total energy impingement period of one minute (7 × approximately 8.5 seconds) is achieved with a constant microwave power output of 2.4 kW, that is to say, with the full requirement power of 2.4 kW per pack of lasagne.

To correspond to the rectangular pack surface of 190 × 140 mm, a rectangular microwave wave guide having a cross-section of 43 × 86 mm is used. The pack and the outlet of the wave guide therefore both have geometrically similar rectangular cross-sections.

The cross-sectional area of the discharge outlet of the microwave wave guide, having the above dimensions is 3,700 mm$^2$ and the surface area of the pack is 190 × 140 mm which equals 26,000 mm$^2$. Accordingly the ratio of the cross-sectional area of the wave to that of the pack is of the order of 1:7. The spacing (D) from the microwave discharge outlet to the surface of the pack is set at 50 mm.

A microwave system is employed which operates at a wave-length of 12 cm, i.e. 120 mm, which corresponds to a frequency of 2.45 GHz.

The temperature distribution within the pack caused by such irradiation is shown in FIG. 3. This Figure shows that the temperature differences in the various regions of the pack, especially in the edge regions, is only minimal, so there is no possibility of the edge regions being burnt. Accordingly, a highly uniform degree of sterilisation is achieved over the whole area.

A comparative test is shown in FIG. 4, in which the dimensions of the pack and of the discharge outlet for the microwave radiation were the same as stated hereinbefore but in which the spacing D is reduced to 20 mm. It can be seen that, with such a spacing D, the temperature in the center of the product is more than 25% higher than that at the edges of the product. Such a temperature profile is, nevertheless, acceptable, because an even distribution of temperature is established by a migration of heat from the center of the pack outwardly.

The temperature distribution chart shown in FIG. 5, was achieved utilising the same discharge outlet cross-sectional area and pack size as described hereinbefore with reference to FIGS. 3 and 4. However, the spacing D was increased to 180 mm, that is to say, longer than the wave-length of the radiation of 120 mm.

The temperature profile shown in FIG. 5 clearly shows that the edges of the pack were heated to a temperature almost twice as high as the center of the pack.

If an attempt is made to carry out a pasteurising process using a spacing D of 180 mm with the aim of achieving a pasteurisation temperature of 80° C. in the centre of the product, the edge temperatures will be 120° C. or above. Such a high temperature will cause the product to ignite, or will cause the packs to burst open as a result of the steam pressure produced by evaporation of water in the product.

We claim:

1. Apparatus for the continuous, uniform and rapid microwave heating of a load contained in sealed packs permeable to microwaves, comprising:
   (a) an elongate treatment chamber,
   (b) conveyor means carrying a plurality of sealed packs permeable to microwaves and each containing a load to be heated when passing through said chamber, said conveyor means being provided with longitudinally spaced markers correlating with the placement of said packs on said conveyor means,
   (c) a plurality of upper and lower microwave guide means projecting into said chamber above and below said packs and directed toward said packs, said microwave guide means including outlets operatively connected to the ends thereof, and means for varying the spacing of said outlets from the surface of said packs,
   (d) microwave generator means associated with each of said guide means for generating microwave energy of a fixed predetermined wavelength,
   (e) control means for controlling said conveyor means and said generator means,
   (f) scanning means for detecting said markers, said scanning means being connected to said control means, and wherein
   (g) the cross-sectional shape of said outlets generally corresponds to the geometrical surface shape of said packs, and said outlets are spaced from the surfaces of said packs by a distance equal to or less than one wavelength of the microwave energy used for irradiation of said packs.

2. An apparatus as recited in claim 1 wherein the cross-sectional area of said outlet of said wave guide is a function of the surface area of said foodstuff, the ratio of said outlet cross-sectional area to said foodstuff surface area lying within the range of from 1:2 to 1:8.

3. An apparatus as recited in claim 2 wherein said ratio lies within the range of from 1:4 to 1:6.

4. An apparatus as recited in claim 2 wherein said ratio is 1:4.

5. An apparatus as recited in claim 1 wherein said geometrically corresponding shapes are circular.

6. An apparatus as recited in claim 1 wherein said geometrically corresponding shapes are rectangular.

7. An apparatus as recited in claim 6 wherein said geometrically corresponding shapes are square.

8. An apparatus as recited in claim 1 wherein the wavelength of said microwave radiation is 12 cm corresponding to a frequency of 2.45 GHz.

9. An apparatus as recited in claim 1 wherein each said wave guide means comprises a main body portion said outlets comprise sleeve means mounted on said body portion, said mounting permitting vertical displacement and locking of said sleeve means relative to said wave guide means to permit adjustment of said spacing of said outlet from said pack surface, said sleeve means and said main body portion having geometrically corresponding shapes.

* * * * *